(12) United States Patent
Urbani (10) Patent No.: US 10,457,584 B2
(45) Date of Patent: Oct. 29, 2019

(54) ALTERNATIVE ADDITIVES TO ENHANCE SLURRY DEWATERING

(71) Applicant: ECOLAB USA INC., St. Paul, MN (US)

(72) Inventor: Carl N. Urbani, Lesmurdie (AU)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/893,279

(22) Filed: Feb. 9, 2018

(65) Prior Publication Data

US 2018/0162763 A1   Jun. 14, 2018

Related U.S. Application Data

(63) Continuation of application No. 14/254,286, filed on Apr. 16, 2014, now Pat. No. 9,896,366, which is a continuation-in-part of application No. 14/190,507, filed on Feb. 26, 2014, now Pat. No. 9,630,855.

(51) Int. Cl.

| | |
|---|---|
| *C01F 7/14* | (2006.01) |
| *C02F 11/14* | (2019.01) |
| *F26B 5/00* | (2006.01) |
| *C22B 3/22* | (2006.01) |
| *C02F 103/10* | (2006.01) |

(52) U.S. Cl.
CPC ............. *C02F 11/14* (2013.01); *C01F 7/148* (2013.01); *F26B 5/005* (2013.01); *C02F 2103/10* (2013.01); *C22B 3/22* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 4,153,549 A | 5/1979 | Wang et al. | |
| 4,231,868 A | 11/1980 | Wang et al. | |
| 4,737,352 A | 4/1988 | Owen et al. | |
| 4,939,288 A | 7/1990 | Talley | |
| 5,011,612 A | 4/1991 | Keeney | |
| 5,167,831 A | 12/1992 | Dimas | |
| 5,451,329 A * | 9/1995 | Bode | C01F 7/148 209/5 |
| 6,191,116 B1 | 2/2001 | Kasica et al. | |

(Continued)

FOREIGN PATENT DOCUMENTS

| | | |
|---|---|---|
| CN | 1500415 A | 6/2004 |
| CN | 102471083 A | 5/2012 |

(Continued)

OTHER PUBLICATIONS

Extended European Search Report for European Application No. 5755912.1, dated Sep. 11, 2017, 2 pages.

(Continued)

*Primary Examiner* — Melissa S Swain
(74) *Attorney, Agent, or Firm* — Kagan Binder, PLLC (57) ABSTRACT

The invention provides methods and compositions for improving dewatering of mineral slurry. The method comprises adding an R-Succinic Compound (such as octadecenyl succinic acid, hexadecenyl succinic acid, and/or dodecenyl succinic acid) to the slurry. The R-Succinic Compound removes water that would otherwise be trapped within the filtered slurry cake.

17 Claims, 3 Drawing Sheets

(56) References Cited

U.S. PATENT DOCUMENTS

| | | |
|---|---|---|
| 6,599,547 B1 | 7/2003 | Martinez-Serna Villagran et al. |
| 6,706,144 B1 | 3/2004 | Furman, Jr. et al. |
| 7,771,681 B2 | 8/2010 | Kouznetsov et al. |
| 8,282,689 B2 | 10/2012 | Kouznetsov et al. |
| 9,458,025 B2 | 10/2016 | Yokoyama et al. |
| 9,630,855 B2 | 4/2017 | Urbani |
| 9,718,699 B1 | 8/2017 | Andruszkiewicz et al. |
| 9,896,366 B2 | 2/2018 | Urbani |
| 2006/0251566 A1 | 11/2006 | Yoon et al. |
| 2008/0070805 A1 | 3/2008 | Munoz et al. |
| 2008/0199677 A1 | 8/2008 | Ukai |
| 2009/0301972 A1 | 12/2009 | Hines et al. |
| 2011/0135930 A1 | 6/2011 | Yokoyama et al. |
| 2012/0288438 A1 | 11/2012 | Wang et al. |
| 2013/0005864 A1 | 1/2013 | Baumann |
| 2014/0144072 A1 | 5/2014 | Bland et al. |
| 2016/0200954 A1 | 7/2016 | Lamperd et al. |

FOREIGN PATENT DOCUMENTS

| | | |
|---|---|---|
| EP | 0286034 A1 | 10/1988 |
| EP | 0417360 A1 | 3/1991 |
| EP | 0460811 A1 | 12/1991 |
| EP | 0672620 A1 | 9/1995 |
| EP | 1406711 A2 | 4/2004 |
| JP | 2002028696 A | 1/2002 |
| RU | 2354614 C1 | 5/2009 |
| RU | 2372305 C2 | 11/2009 |
| RU | 2472706 C2 | 1/2013 |
| UA | 94453 C2 | 5/2011 |

OTHER PUBLICATIONS

International Search Report for International Application No. PCT/US2015/016146, dated Jul. 31, 2015, 3 pages.

Written Opinion for International Application No. PCT/US2015/016146, dated Jul. 31, 2015, 5 pages.

International Official Action for Russian Application No. 2016137951, dated Nov. 8, 2017 (8 pages).

Daniel Flynn, The Nalco Water Handbook, Third Edition, McGraw Hill Publishing, 2009, Chapter 26—Sludge Manipulation, pp. 26.1-26.20.

Daniel Flynn, The Nalco Water Handbook, Third Edition, McGraw Hill Publishing, 2009, Chapters 6-8, pp. 6.1-8.30.

Kirk Othmer, Encyclopedia of Chemical Technology, Third Edition, vol. 8, Diuretics to Emulsions, 1980, pp. 900-912.

Extended European Search Report for European Application No. 18215189.4, dated Mar. 6, 2019, 7 pages.

Examination Report for Australian Application No. 2015223407, dated Nov. 15, 2018, 2 pages.

Examination Report for Saudi Arabian Application No. 516371720, dated Jan. 30, 2019, 9 pages (6 pages Official Copy, 3 pages English Translation).

Examination Report for Australian Application No. 2018200936, dated Feb. 7, 2019, 9 pages.

Office Action in Chinese Application No. 201580016873.4, dated May 31, 2018, 11 pages (5 pages of Official Copy, 6 pages of English Translation).

Notification of Grant of Patent for Invention and Search Report in Chinese Application 201580016873.4, dated Apr. 1, 2019, 8 pages (4 pages Official Copy, 4 pages English Translation).

Examination Report for Indian Application No. 201617028915, dated Jul. 25, 2019, 6 pages.

* cited by examiner

ALTERNATIVE ADDITIVES TO ENHANCE SLURRY DEWATERING

This application is a Continuation of U.S. patent application Ser. No. 14/254,286, filed Apr. 16, 2014 which is a Continuation in part of U.S. Pat. No. 9,630,855, issued Apr. 25, 2017, the entire contents of which are incorporated herein by reference.

BACKGROUND OF THE INVENTION

The invention relates to compositions, methods, and apparatuses for improving the dewatering of mineral slurries. Mining operations typically involve grinding and slurrying of mineral ores with water or leach solution (chemical in water) that then undergoes a series of processes to obtain the mineral in a purer form. An important, often final, step in minerals processing is the removal of water from the process slurry, yielding a final cake (either minerals or tailings) in a solid, 'dry' form. Dewatering processes such as filtration, with addition of a dewatering aid, are often utilized, to remove the water from the mineral slurry. A dewatering aid is, typically, a chemical additive that is added to the mineral slurry just prior to filtration (or in some cases to wash water that is added on top of the filtered mineral slurry cake) which aims to help reduce the final moisture content of the filtered solids. The reduction in moisture content of the mineral solid can lead to higher mineral product quality, higher filtration and mineral transportation throughput and greater recovery of leach solution or water. Thus there is clear need and utility for a method of improving the range and performance of dewatering aids that can be used in mineral processing applications.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a method of enhancing the dewatering of minerals. The method comprises the step of adding to the slurry or to wash water added to the slurry; at least one R-succinic compound.

The R-succinic compound may be one item selected from the list consisting of: octadecenyl succinic acid, hexadecenyl succinic acid, dodecenyl succinic acid, and any combination thereof. The composition may further comprise a base. The composition may be more effective as a dewatering agent than a similar composition comprising a similar or greater molar amount of dioctylsulfosuccinate, fatty acid, or any combination thereof than the molar amount of R-succinic compound in the composition. The composition may be added to mineral slurry upstream from a filtration stage of a mineral processing operation. The composition may be added to wash fluid added to the slurry or used within the filtration process. The R-succinic compound may form in situ within the slurry or wash fluid. The R-succinic compound may form from an anhydride added to the slurry or wash fluid.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Definitions

The following definitions are provided to determine how terms used in this application, and in particular how the claims, are to be construed. The organization of the definitions is for convenience only and is not intended to limit any of the definitions to any particular category.

"R-Succinic Compound" means any one or more molecule(s) (including but not limited to octadecenyl succinic acid, hexadecenyl succinic acid, and/or dodecenyl succinic acid), whose structure conforms to the generalized structure of: Formula 1, Formula 2, conjugate acid-bases thereof, and any combination thereof, wherein Formula 1 and Formula 2 are:

where R and R' are independent, distinct, and represent alkyl, alkenyl, or aromatic hydrocarbon groups containing 1-30 carbon atoms

"Octadecenyl Succinic Acid" means a molecule and acid-base conjugates thereof having a general structure of:

"Hexadecenyl Succinic Acid" means a molecule and acid-base conjugates thereof having a general structure of:

"Dodecenyl Succinic Acid" means a molecule and acid-base conjugates thereof having a general structure of:

"Consisting Essentially of" means that the methods and compositions may include additional steps, components, ingredients or the like, but only if the additional steps, components and/or ingredients do not materially alter the basic and novel characteristics of the claimed methods and compositions.

"Dewatering" means removing water absorbed by or borne by a water bearing mineral pulp, sludge, or mineral slurry undergoing a mineral processing application, dewatering may be performed for a number of reasons including but not limited to enabling ore handling, easing transport, facilitating further processing, and/or disposing of gangue, dewatering is accomplished at least in part by items which include but are not limited to one or more of: dewatering screens, vacuuming, suction, sedimentation, filtering, and thermal drying, and any of the methods/apparatuses described in *The Nalco Water Handbook* (3rd Edition), by Daniel Flynn, McGraw Hill (2009) in general and in particular pp. 26.1-26.20.

"Filter" means a structure constructed and arranged to remove suspended materials from within a liquid that is passed through it, more detailed descriptions of filters and filtration are described in *The Nalco Water Handbook* (3rd Edition), by Daniel Flynn, McGraw Hill (2009) in general and in particular pp. 6.1-8.30.

"Filter Cake" means the accumulation of solid matter that is retained on a filter, it increases in the course of filtration and becomes thicker as more particulate matter is retained, with increasing layer thickness the flow resistance of the filter cake increases, and if not removed soon enough, eventually thick filter cake can disrupt filtration because the flow resistance of the filter cake gets so high that too little of the liquid from the slurry being filtered can pass through the filter cake and the filter plugs.

"Mineral Processing Application" means a process whose step(s) includes the separation of one or more commercially valuable minerals from a rock, ore or an ore derivative, it includes but is not limited to operations used to process materials who have as a constituent: metallic minerals, non-metallic minerals, zinc, tin, aluminum, feldspar, coal, iron, copper, gold, silver, rare earth metals, diamonds, sulfur, noble metals, ferrous minerals, cobalt, nickel, metal sulfides, metal oxides, lithium, lead, molybdenum, cadmium, cobalt, sulfides, oxides, pyrites, hydrates, chromium, manganese, lime, calcium, carbonates, solids, silicates, tectosilicates, phyllosilicates, inosilicates, cyclosilicates, sorosilicates, orthosilicates, nesosilicates, non-silicates, nitrates, native element minerals, sulfides, oxides, halides, sulfates, gypsums, calcites, phosphates, organic minerals, and any combination thereof and/or of additional representative minerals and/or processes described in the "extended sense" of *Wills' Mineral Processing Technology: An Introduction to the Practical Aspects of Ore Treatment and Mineral Recovery*, (7th Edition), by B. A. Wills, Elsevier Ltd, (2006).

"Membrane" means a structure having lateral dimensions much greater than its thickness through which a mass transfer may occur, membranes may be used to filter liquids.

"Separation" and "Separation Method" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Slurry" means a mixture comprising a liquid medium within which finely divided solids are dispersed or suspended, the liquid medium may be entirely water, partially water, or may not contain any water at all.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Water Soluble" means materials that are soluble in water to at least 3%, by weight, at 25 degrees C.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

Embodiments

At least one embodiment of the invention is directed towards the addition of a dewatering composition to a dewatering stage of a mineral processing application. The composition comprises at least one R-succinic compound. The R-succinic compound may be one item selected from: octadecenyl succinic acid, hexadecenyl succinic acid, dodecenyl succinic acid, and any combination thereof. Some representative examples of mineral processing applications and details thereof are described in the references: *Dictionary of Mining, Mineral, and Related Terms*, American Geological Institute, 2nd edition (June 1997), *SME Mining Reference Handbook*, by Raymond L. Lowrie, Society for Mining Metallurgy and Exploration, (2002), *Introductory Mining Engineering*, by Howard L. Hartman, John Wiley & Sons, (2002), and *Evaluating Mineral Projects: Applications and Misconceptions*, by Thomas F. Torries, Society for Mining Metallurgy and Exploration, (1998). The dewatering stage can occur before, during, and or after any one, some, or all of the various processing stages described therein.

Figure 1:
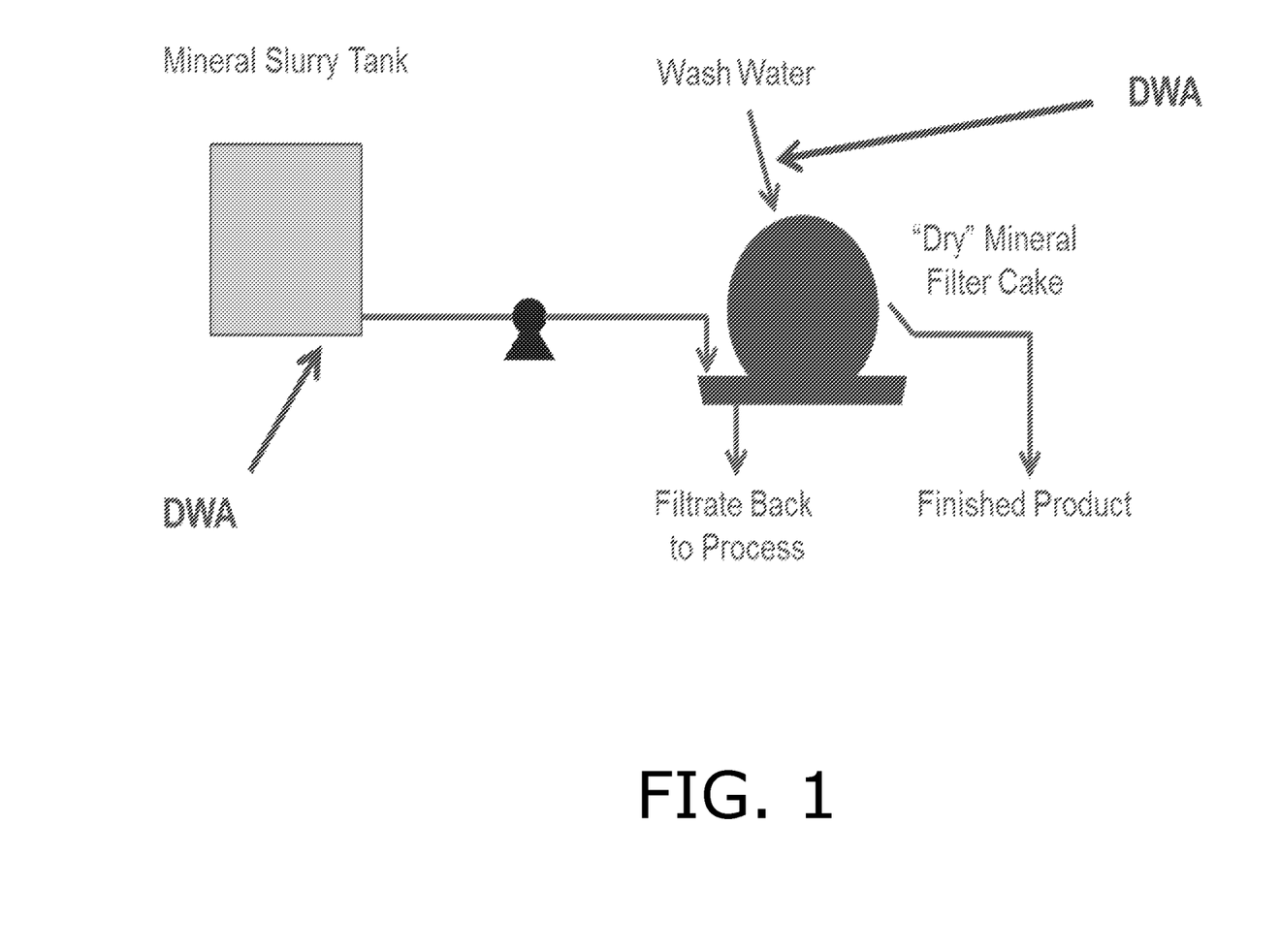
FIG. 1 is an illustration of the application of the invention in the Filtration Stage of a Mineral Processing Process which shows options for addition of the Dewatering Aid (DWA).

As illustrated in FIG. 1, in at least one embodiment wash fluid is added to the slurry before, during, and/or after the separation. The wash fluid may comprise water and/or may consist essentially of water. The composition may be added to the wash fluid, may be added to the slurry alongside wash fluid, may be added to the slurry before the wash fluid, may be added to the slurry after the wash fluid, and any combination thereof.

The effectiveness of this composition is quite unexpected. As described in such references as U.S. Pat. Nos. 5,011,612, 5,454,329, and 5,167,831, US Published Patent Application 2012/0288438 A1, and European Patent Documents EP0417360B1, EP0672620B1, EP1406711B1, EP0460811A1, EP0286034A1, fatty acids such as oleic acid and alkylsulfosuccinate compounds such as dioctylsulfosuccinate are known to be effective dewatering agents. The effectiveness of this composition however is in contrast to previous expectations. In prior art compositions it was assumed that a strong carboxylic acid was needed to grasp the water molecules and the fatty region was to address steric and lipophilic obstacles the acid faced. In contrast the structure of the open ring, and in particular the presence of two reflection carboxyl groups results in an acid that has an overall pKa which is lower than those of the prior art yet which is more effective than the prior art. In addition because of its lower pKa, R-succinic compounds have fewer unwanted downstream reactions than prior art fatty acid dewatering agents. In at least one embodiment the composition comprises an R-succinic compound with a lower pKa than dioctylsulfosuccinate and/or oleic acid yet is more effective as a dewatering agent.

Without being limited by a particular theory or design of the invention or of the scope afforded in construing the claims, it is believed that the unique structure of the R-succinic compound is what causes exceptionally effective dewatering effects. The R-succinic compound comprises an open ring which contains carbonyl and hydroxide groups whose unique charge distribution may be able to "grasp" and "attach" more effectively to the mineral surface and thereby act to replace water molecules that would otherwise remain hydrogen bonded to the surface. The ring structure and "two-headed" nature of the acid site therefore works better than would be expected by the lower pKa.

In at least one embodiment the composition also comprises a ring opening agent. Under certain chemical conditions the open ring of the R-succinic compound could close by the formation of an anhydride bond between the hydroxide groups. The ring opening agent acts to prevent such ring closings. In at least one embodiment the ring opening agent is a base. The base may be selected from the list consisting of; potassium hydroxide, sodium hydroxide, sodium bicarbonate, sodium carbonate, ammonia, ammonium hydroxide, organic bases (including but not limited to triethylamine), and any combination thereof. The ring opening agent may be a catalyst and/or may be a reactive composition. In at least one embodiment the composition comprises an R-succinic compound in equilibrium between being open ringed and close ringed and the ring opening agent favorably shifts the equilibrium to favor the open ringed configuration. In at least one embodiment if in excess the ring opening agent would hydrolyze at least part of the ring and the dosage of the agent is sufficient to favorably shift the equilibrium to favor the open ringed configuration but not substantially hydrolyze any part of the ring.

Figure 2:
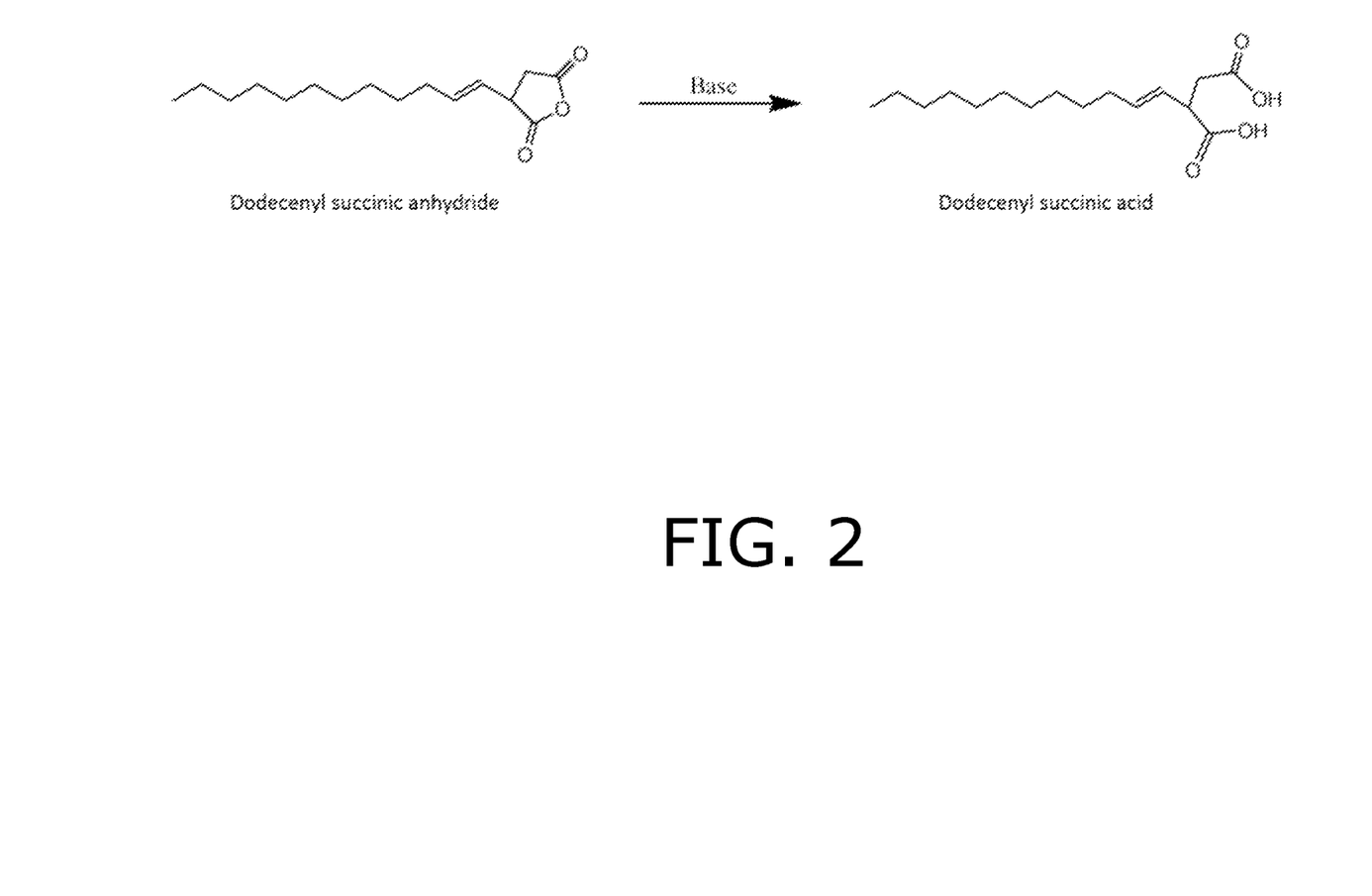
FIG. 2 is an illustration of the synthesis of a specific "R-Succinic Compound" where R=C12 alkenyl.

In at least one embodiment the R-succinic compound is formed by opening the ring of an R-succinic anhydride compound. For example as illustrated in FIG. 2 dodecenyl succinic anhydride (which is representative of any C1-C100 succinic anhydride) can be used to make the R-succinic compound. The R-succinic compound may be formed as a result of a base driven reaction.

In at least one embodiment the R-succinic compound is stored in an anhydride form and its ring is opened immediately prior to or simultaneous to its introduction into the slurry or into the wash fluid.

In at least one embodiment the composition reduces the amount of wash fluid required to remove the same amount of water from the slurry.

In at least one embodiment the composition reduces the amount of energy required to further dry the solids.

In at least one embodiment a lower dosage of the composition (and/or of the R-succinic compound) is required to remove the same amount of water from the slurry relative to use of a prior art dewatering agent.

In at least one embodiment the composition reduces the amount of water remaining with the filter cake resulting from a separation method that the slurry goes through.

Figure 3:
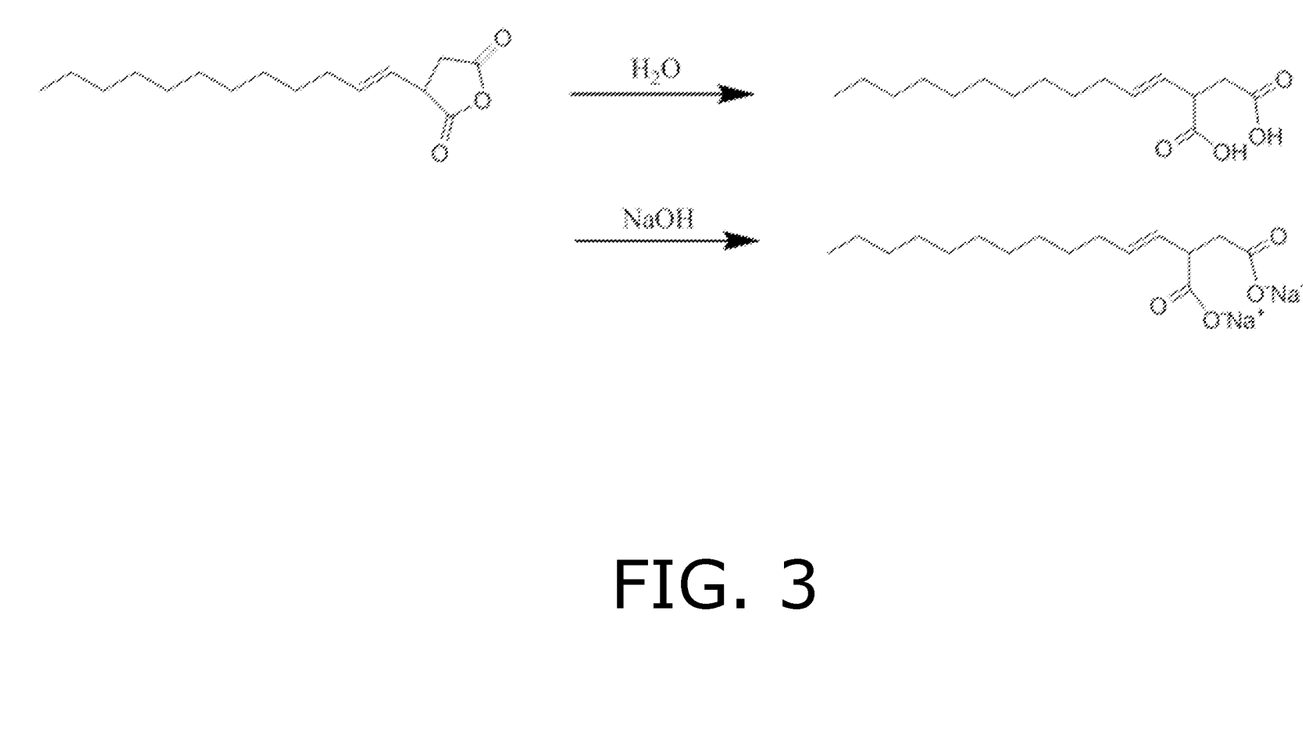
FIG. 3 is an illustration of the synthesis of various forms of a specific "R-Succinic Compound" where R=C12 alkenyl.

In at least one embodiment the acid salt of the R-succinic compound may also be produced by base addition to the acid or to the anhydride. The counter ion of acid salt formed will depend on the base used. As illustrated in FIG. 3, the use of sodium hydroxide results in the Na+ salt, but salts of potassium, lithium, ammonium, or any other respective ion may also form.

In at least one embodiment the R-succinic compound is in the form of: an anhydride form, an acid form, an acid salt form, and any combination thereof.

In at least one embodiment the mineral processing application excludes a method that includes processing aluminum. In at least one embodiment the mineral processing application excludes some or all of the steps of the Bayer Process.

Examples

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A number of formulations were prepared to simulate the dewatering effectiveness of the inventive composition. Table 1 summarizes the formulations.

TABLE 1

| Formulation | Active | Active % | Water/ KOH % | Other Components % |
|---|---|---|---|---|
| A | Hexadecenyl succinic acid | 20 | 67 | 13 |
| B | Hexadecenyl succinic acid | 5 | 95 | 0 |
| C | Commercially available mixture of hexadecenyl succinic anhydride and octadecenyl succinic anhydride | 99 | 0 | 1 |
| D | Commercially available fatty acid based product | 25 | 0 | 75 |

The test procedure that the samples underwent was as follows:

Lithium Mineral Slurry

Filter feed slurry from an operating lithium mineral processing plant was obtained and used in the test. In preparation for the test this slurry was first filtered. The filtrate was collected and the filter cake air-dried at room temperature. Filtrate (25 g) and process filter cake (25 g) was added to 100 mL polycarbonate bottles to prepare the slurry at a known concentration. Dewatering aid test solutions were prepared at 1 and 2% concentration in deionized water. Formulation C was applied in neat form, undiluted.

A known volume of dewatering aid test solution was added to a sample of lithium slurry and thoroughly mixed. The slurry was then poured into a Buchner funnel (70 mm diam., Whatman coarse filter paper) and allowed to settle for 20 sec then a vacuum was applied for 20 sec. The cake was then sampled and the moisture content was determined gravimetrically by drying in an oven at 110° C.

Magnetite Product Slurry

Filter feed slurry from an operating magnetite mineral processing plant was obtained and used in the test. In preparation for the test this slurry was first filtered. The filtrate was collected and the filter cake air-dried at room temperature. Filtrate (17 g) and magnetite filter cake (33 g) was added to 100 mL polycarbonate bottles to prepare the slurry at a known concentration. Dewatering aid test solutions were prepared at 1 and 2% concentration in deionized water.

A known volume of dewatering aid test solution was added to a sample of magnetite slurry and thoroughly mixed. The slurry was then poured into a Buchner funnel (70 mm diam., Whatman coarse filter paper) and allowed to settle for 20 sec then a vacuum was applied for 20 sec. The cake was then sampled and the moisture content was determined gravimetrically by drying in an oven at 110° C.

Copper Product Slurry

Filter feed slurry from an operating copper mineral processing plant was obtained and used in the test. In preparation for the test this slurry was first filtered. The filtrate was collected and the filter cake air-dried at room temperature. Filtrate (15 g) and copper filter cake (35 g) was added to 100 mL polycarbonate bottles to prepare the slurry at a known concentration.

A known volume of dewatering was added in neat form to a sample of copper slurry and thoroughly mixed. The slurry was then poured into a Buchner funnel (70 mm diam., Whatman coarse filter paper) and allowed to settle for 20 sec then a vacuum was applied for 70 sec. The cake was then sampled and the moisture content was determined gravimetrically by drying in an oven at 110° C.

The results of the tests were as follows:

Dewatering Aid Tests

TABLE 2

Effect of formulations on dewatering of lithium product slurry

| Treatment | Actives Dose (g/T of lithium) | % Reduction in Cake Moisture |
|---|---|---|
| A | 48 | 4.8 |
|   | 80 | 16.0 |
|   | 160 | 43.1 |
| C | 200 | 25.5 |
| D | 200 | 12.5 |

TABLE 3

Effect of HDSA formulations on dewatering of magnetite product slurry

| Treatment | Actives Dose (g/T of magnetite) | % Reduction in Cake Moisture |
|---|---|---|
| A | 120 | 7.6 |
| B | 300 | 11.5 |

TABLE 4

Effect of alkenyl succinic anhydrides on dewatering of copper product slurry

| Treatment | Actives Dose (g/T of copper) | % Reduction in Cake Moisture |
|---|---|---|
| C | 100 | 12.8 |
|   | 200 | 14.5 |

In all tests, there was considerable moisture reduction in the filter cakes that were treated with the alkenyl succinic acid or anhydride.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of separating alumina trihydrate crystals from an alumina trihydrate bearing slurry, the method comprising: combining an alkenyl succinic anhydride and water; adding the combination to the slurry; and separating alumina trihydrate crystals from the slurry.

2. The method of claim 1 wherein an R-succinic compound forms in situ from the alkenyl succinic anhydride, and wherein the R-succinic compound has a structure selected from formula (I) or formula (II), a conjugate acid-base of the R-succinic compound having a structure selected from formula (I) or formula (II), and combinations thereof; wherein formula (I) is (I)

and formula (II) is (II)

and wherein R and R' are independent, distinct, and represent alkyl, alkenyl, or aromatic hydrocarbon groups containing 1-30 carbon atoms.

3. The method of claim 1 wherein the alkenyl succinic anhydride undergoes ring opening in the water, or in the slurry.

4. The method of claim 1 wherein the separating comprises crystallizing.

5. The method of claim 4 wherein the separating further comprises filtering.

6. The method of claim 1 wherein the alumina trihydrate bearing slurry is a caustic Bayer liquor.

7. The method of claim 1 wherein the composition comprises 5-80 mg alkenyl succinic anhydride per 200 mL water.

8. The method of claim 1 wherein the composition is added upstream of the calcination stage.

9. The method of claim 1 wherein the composition is added to one or more precipitation tanks.

10. A method of separating alumina trihydrate crystals from an alumina trihydrate bearing slurry, the method comprising: adding a composition comprising water, an R-succinic compound and an alkenyl succinic anhydride to the slurry; and separating alumina trihydrate crystals from the slurry, wherein the R-succinic compound has a structure selected from formula (I) or formula (II), a conjugate acid-base of the R-succinic compound having a structure selected from formula (I) or formula (II), and combinations thereof; wherein formula (I) is (I)

and formula (II) is (II)

and wherein R and R' are independent, distinct, and represent alkyl, alkenyl, or aromatic hydrocarbon groups containing 1-30 carbon atoms.

11. The method of claim 10 wherein the alkenyl succinic anhydride undergoes ring opening in the water, or in the slurry.

12. The method of claim 10 wherein the separating comprises crystallizing.

13. The method of claim 10 wherein the separating further comprises filtering.

14. The method of claim 10 wherein the alumina trihydrate bearing slurry is a caustic Bayer liquor.

15. The method of claim 10 wherein the composition comprises 5 mg-80 mg alkenyl succinic anhydride per 200 mL water.

16. The method of claim 10 wherein the composition is added upstream of the calcination stage.

17. The method of claim 10 wherein the composition is added to one or more precipitation tanks.

* * * * *